(12) United States Patent
Chandran et al.

(10) Patent No.: US 10,175,807 B2
(45) Date of Patent: Jan. 8, 2019

(54) SUPPORT OF NARROW TIP STYLUSES ON TOUCH SCREEN DEVICES

(71) Applicant: STMicroelectronics Asia Pacific Pte Ltd, Singapore (SG)

(72) Inventors: Praveesh Chandran, Singapore (SG); Manivannan Ponnarasu, Singapore (SG); Mythreyi Nagarajan, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 267 days.

(21) Appl. No.: 14/974,299

(22) Filed: Dec. 18, 2015

(65) Prior Publication Data

US 2017/0177136 A1    Jun. 22, 2017

(51) Int. Cl.
    G06F 3/041 (2006.01)
    G06F 3/0354 (2013.01)
    G06F 3/044 (2006.01)

(52) U.S. Cl.
    CPC ........ G06F 3/0416 (2013.01); G06F 3/03545 (2013.01); G06F 3/044 (2013.01); G06F 2203/04106 (2013.01)

(58) Field of Classification Search
    CPC ..... G06F 3/0416; G06F 3/03545; G06F 3/044
    See application file for complete search history.

(56) References Cited

U.S. PATENT DOCUMENTS

| 8,432,170 | B1 | 4/2013 | Walsh et al. |
| 9,081,450 | B1 | 7/2015 | Mohindra |
| 2008/0012835 | A1 | 1/2008 | Rimon et al. |
| 2013/0155016 | A1* | 6/2013 | Chang ............ G06F 3/044 345/174 |
| 2013/0241890 | A1 | 9/2013 | Sharma |
| 2014/0210780 | A1* | 7/2014 | Lee ............ G06F 3/044 345/174 |
| 2014/0240242 | A1 | 8/2014 | Kawalkar et al. |
| 2014/0253504 | A1 | 9/2014 | Noshadi et al. |
| 2015/0242050 | A1 | 8/2015 | Huang et al. |
| 2015/0253897 | A1 | 9/2015 | Liang et al. |
| 2016/0077625 | A1 | 3/2016 | Soo et al. |
| 2016/0195946 | A1 | 7/2016 | Ahn et al. |
| 2017/0131798 | A1* | 5/2017 | Geaghan ........... G06F 3/044 |
| 2017/0153763 | A1* | 6/2017 | Vavra ............ G06F 3/0488 |
| 2017/0177136 | A1* | 6/2017 | Chandran ........... G06F 3/0416 |
| 2018/0074637 | A1 | 3/2018 | Rosenberg et al. |

* cited by examiner

*Primary Examiner* — William Boddie
*Assistant Examiner* — Bipin Gyawali
(74) *Attorney, Agent, or Firm* — Crowe & Dunlevy

(57) ABSTRACT

An electronic device disclosed herein includes a touch screen controller to identify an island i.e., a matrix of acquired touch data values, the island including adjacent touch data values indicating a potential touch of a touch sensitive screen. A first sharpness of the island is calculated using a first normalization type and not a second normalization type. A second sharpness of the island is calculated using the first and second normalization types if the first sharpness is greater than the sharpness threshold. A dynamic variance threshold is determined as a function of the second sharpness. A dynamic strength threshold is determined as a function of the second sharpness if a variance of the island is greater than the dynamic variance threshold, and the island is determined to be a valid stylus island if the peak strength is greater than the dynamic strength threshold.

25 Claims, 6 Drawing Sheets

SUPPORT OF NARROW TIP STYLUSES ON TOUCH SCREEN DEVICES

TECHNICAL FIELD

This disclosure relates to the field of touch screen devices, and more particularly, to the accurate acquisition of touch coordinates when particularly narrow passive styluses are used.

BACKGROUND

Mobile electronic devices, such as smartphones, tablets, and smartwatches are in wide use in the world today. Such electronic devices typically employ a touch sensitive display for both data display as well as to receive user input. Most of these touch sensitive displays utilize capacitive touch sensing.

A typical touch sensitive display includes a display layer constructed from technology such as LCD, IPS, or AMO-LED, as well as a sensing layer. A transparent layer is adjacent to and spaced apart from the display layer. A typical sensing layer includes a plurality of parallel drive lines, and a plurality of parallel sensing lines. The sensing lines capacitively intersect the drive lines. In operation, a single drive line is driven with a wave, such as a square wave or sine wave. The capacitance between the sensing lines and the driven drive line is sensed at the point where they intersect. Presence of a human finger or a conductive object alters the expected capacitance at the intersection point, and by measuring the change in capacitance, a touch between the finger or conductive object and the touch sensitive display can be detected.

Such conductive objects may include styluses, which are typically cylindrical objects with a point. Where a stylus presents a similar footprint on the touch sensitive display as a fingertip, routines similar or the same as those used to make accurate determinations from the measured capacitance changes due to fingertip touches may be used. However, where a stylus presents a somewhat smaller to substantially smaller footprint on the touch display when compared to a fingertip, routines used to make determinations from the measured capacitances due to fingertip touches may lead to inaccurate results. Routines more sensitive to smaller stylus tips exist, but those may incorrectly detect a finger hover instead of, or in addition to, the stylus tip.

Therefore, further techniques in the area of processing capacitance change data collected by touch sensitive displays from touches made by small styluses are needed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An electronic device disclosed herein includes a touch screen controller to identify an island is matrix of acquired touch data values, the island including adjacent touch data values indicating a potential touch of a touch sensitive screen. A first sharpness of the island is calculated using a first normalization type and not a second normalization type. A second sharpness of the island is calculated using the first and second normalization types if the first sharpness is greater than the sharpness threshold. A dynamic variance threshold is determined as a function of the second sharpness. A dynamic strength threshold is determined as a function of the second sharpness if a variance of the island is less than the dynamic variance threshold, and the island is determined to be a valid stylus island if the peak strength is greater than the dynamic strength threshold.

Also disclosed herein is an electronic device having a touch sensitive display with a processor coupled to the touch sensitive display and configured to acquire touch data values from the touch sensitive display, and identify an island in the touch data values, the island including touch data values acquired from adjacent locations of the touch sensitive display indicating a potential touch. A sum of the touch data values of the island is compared to lower and upper stylus size thresholds, and stylus settings are generated based thereupon.

A first sharpness of the island is calculated using a first normalization type and not a second normalization type, and the island is rejected if the first sharpness is not greater than a sharpness threshold. The sharpness threshold is a function of the stylus settings. A second sharpness of the island is calculated using the first and second normalization types if the first sharpness is greater than the sharpness threshold. A dynamic variance threshold is determined as a function of the second sharpness, and the island is rejected if a variance of the island is greater than the dynamic variance threshold. A dynamic strength threshold is determined as a function of the second sharpness, and the island is rejected if a peak strength of the island is less than the dynamic strength threshold. The island is determined to be a valid stylus island if the peak strength is greater than the dynamic strength threshold.

A method aspect is directed to a method including acquiring touch data values from the touch sensitive display, and identifying an island in the touch data values, with the island having touch data values acquired from adjacent locations of the touch sensitive display indicating a potential touch. The method also includes determining whether touch data values indicate a large stylus or small stylus, and generating stylus settings based thereupon. The method further includes calculating a first sharpness of the island using a first normalization type and not a second normalization type, with the sharpness threshold being a function of the stylus settings, and calculating a second sharpness of the island using the first and second normalization types if the first sharpness is greater than the sharpness threshold. The method then proceeds with determining a dynamic variance threshold as a function of the second sharpness, determining a dynamic strength threshold as a function of the second sharpness if a variance of the island is less than the dynamic variance threshold, and determining the island to be a valid stylus island if the peak strength is greater than the dynamic strength threshold.

A further method aspect is directed to method including identifying an island in a matrix of acquired touch data values, with the island having adjacent touch data values indicating a potential touch of a touch sensitive screen. The method also includes calculating a first sharpness of the island using a first normalization type and not a second normalization type, and calculating a second sharpness of the island using the first and second normalization types if the first sharpness is greater than the sharpness threshold. The method then proceeds with determining a dynamic variance threshold as a function of the second sharpness, determining a dynamic strength threshold as a function of the second sharpness if a variance of the island is less than the dynamic variance threshold, and determining the island to be a valid stylus island if the peak strength is greater than the dynamic strength threshold.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
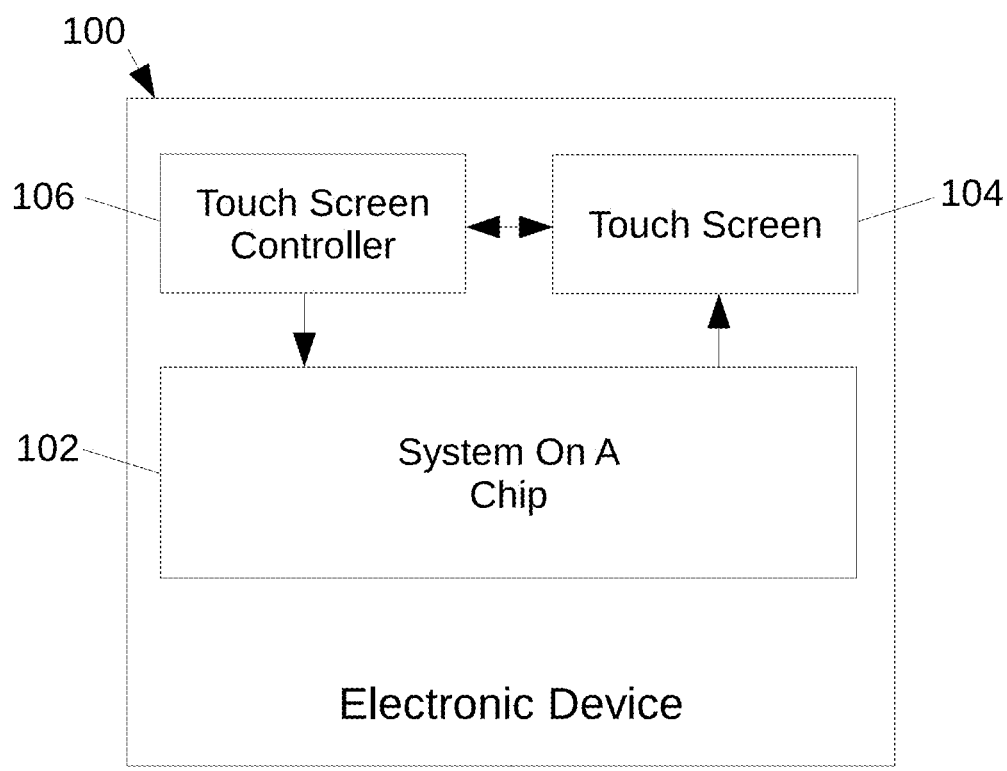
FIG. 1 is a block diagram of an electronic device on which the techniques described herein may be implemented.
Figure 1A:
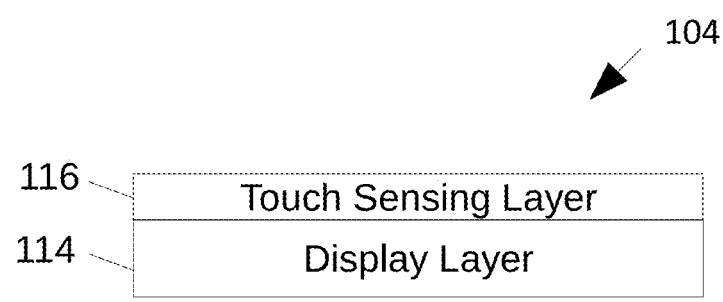
FIG. 1A is a cutaway view of the touch sensitive display of the touch screen of FIG. 1 showing the components thereof.
Figure 1B:
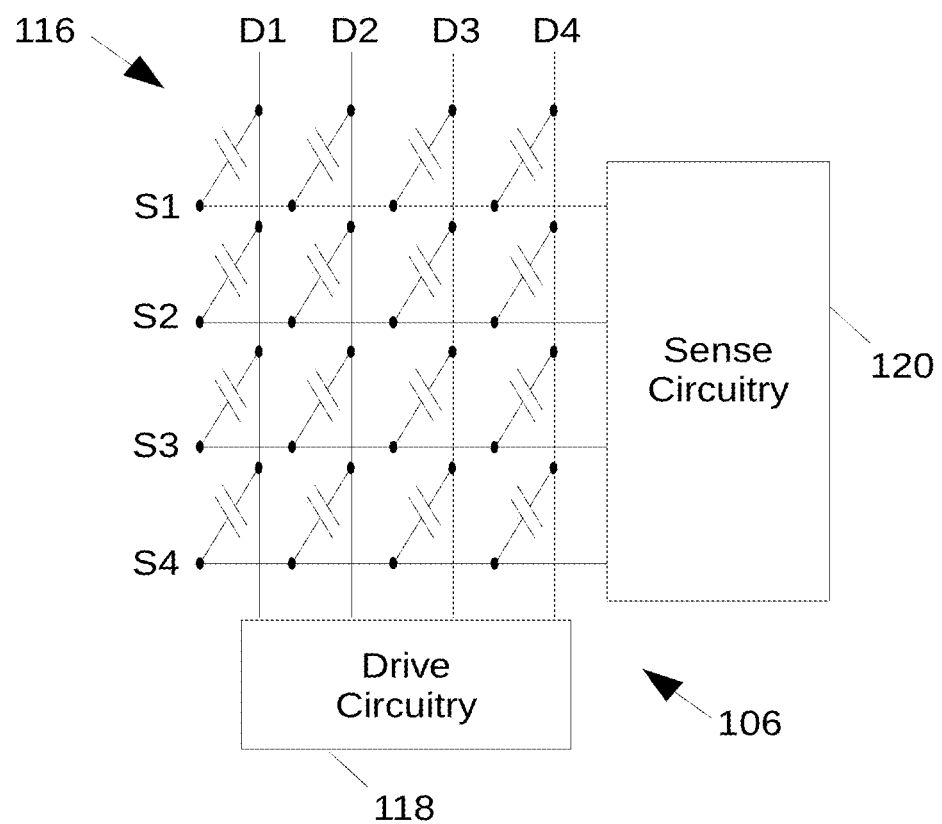
FIG. 1B is a schematic block diagram of the touch screen controller of FIG. 1, and its interconnection with the sense and drive lines of the touch sensing layer of the touch sensitive display of FIG. 1A.

With initial reference to FIGS. 1-1B an electronic device 100 is now described. The electronic device 100 may be a smartphone, smartwatch, wearable, tablet, laptop, or other suitable portable electronic device. The electronic device 100 includes a system on a chip 102 that receives input from a touch screen controller 106 and provides output to a touch module 104.

The touch module 104 includes a display layer 114, with a touch sensing layer 116 adjacent thereto. The touch sensing layer 116 includes drive lines D1-D4 that intersect sense lines S1-S4. The sense lines S1-S4 are coupled to the touch screen controller 106, while the drive lines D1-D4 are coupled to drive circuitry 118. At each intersection point between the drive line D1 and the sense lines S1-S4, a capacitance is formed.

In operation, the driving circuitry 118 drives the drive lines D1-D4 with periodic signals, such as sine waves or square waves. At each intersection point between the drive lines D1-D4 and the sense lines S1-S4, the respective sense line S1-S4 incurs a charge injection proportional to the voltage at the drive lines D1-D4 and a capacitance between the respective sense line S1-S4 and the drive lines D1-D4 is at that intersection point. These capacitances vary in proximity to conductive objects, such as human fingers and styluses, and are measured by the touch screen controller 106 and processed to be touch data values stored in a matrix having entries that correspond to the various intersections of the drive lines D1-D4 with the force lines S1-S4.

As explained, a stylus may be used to provide input to the touch screen 104 instead of a finger. Some styluses may have a tip for contacting the touch screen 104 that is similar in diameter to the portion of a finger that touches the touch screen 104. However, some styluses may have tips that are substantially smaller in diameter than the portion of a finger that touches the touch screen 104, for example less than 2 mm diameter, or even equal to or less than 1 mm in diameter (i.e. 0.8 mm). When using a stylus with a smaller tip, on the order of less than 2 mm, it may be desirable for the touch screen to accurately recognize the small diameter for more precise input, such as may be desirable for note taking or drawing applications. To provide for this precise recognition, the sensitivity of the touch screen 104 may be increased when a stylus with a smaller tip is detected. However, in the absence of the techniques to be disclosed herein, this increase of sensitivity could result the unwanted detection of hovering, for example of the fingers or hand holding the stylus.

Figure 2:
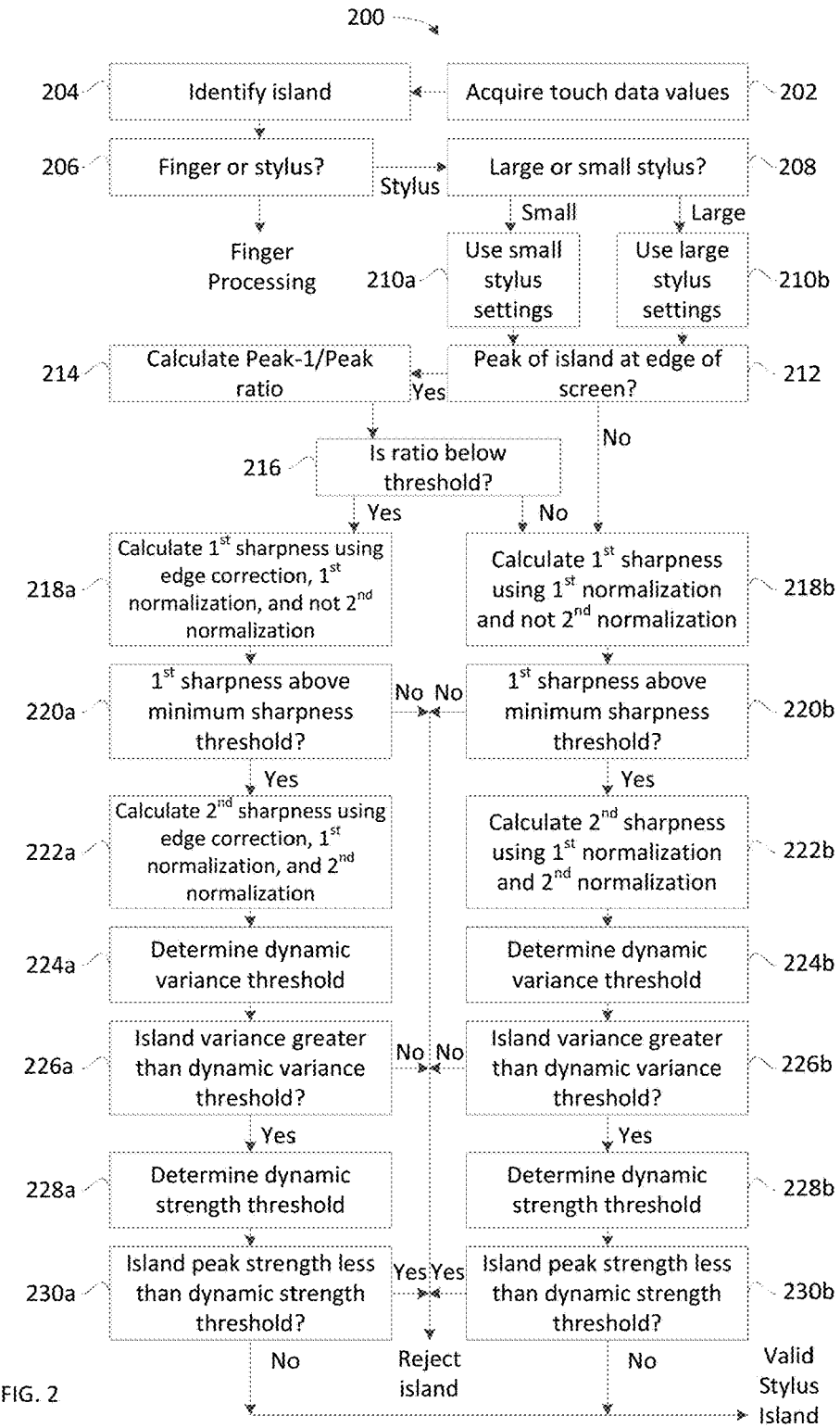
FIG. 2 is a flowchart of a method of sensing styluses and manipulating such touch data in accordance with this disclosure.

These techniques will now be described with reference to the flowchart 200 of FIG. 2. To start, the touch screen controller 106 acquires touch data values corresponding to different locations of the touch sensitive display 104 (Block 202). The touch screen controller 106 then identifies an island in the touch data, the island being comprised of touch data values acquired from adjacent locations of the touch sensitive display 104 that indicate a potential touch (Block 204). The touch screen controller 106 then determines whether the touch data values of the island indicate that a finger or stylus performed the touch (Block 206).

This determination is made by comparing a sum of the touch data values of the island to lower and upper stylus size thresholds. If the sum is greater than the upper stylus size threshold, then the touch screen controller 106 determines that a finger has made the touch, and proceeds with processing the touch as it would as a finger. If the sum is less than the lower stylus size threshold, then the touch screen controller 106 determines that a stylus with a small tip has made the touch and loads small stylus settings (Block 210a). If the sum is less than the upper stylus size threshold but greater than the lower stylus size threshold, then the touch screen controller 106 determines that a stylus with a large tip has made the touch and loads large stylus settings (Block 210b). The difference between the small and large stylus settings is in the various threshold levels used in calculations for subsequent steps.

Once the small or large stylus settings are loaded, the touch screen controller 106 then determines whether the peak value of the island is at the edge of the screen (Block 212). If the peak value of the island is at the edge of the touch screen 104, the touch screen controller 106 then determines whether edge correction is to be applied. This is done (Block 214) by calculating the ratio between touch data values of the island adjacent touch data values adjacent an edge location of the touch screen 104 (shown as Peak−1 in FIG. 5) and the touch data values adjacent the edge location (shown as Peak in FIG. 5).

Figure 5:
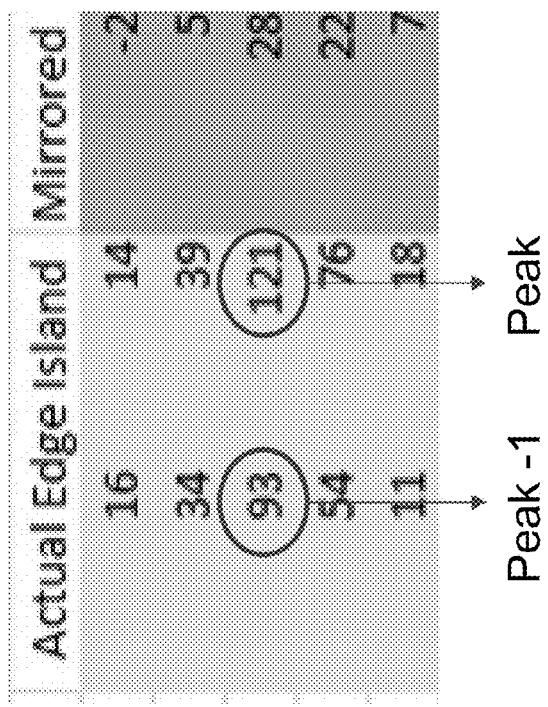
FIG. 5 is a chart showing a 3×3 island of touch data values where the peak value is at an edge of the touch screen.

If the ratio is below a threshold ratio at Block 216, then the touch screen controller 106 generates "phantom" touch data values for the island as a function of a difference between touch data values of the island adjacent the edge location (shown as Peak in FIG. 5) and touch data values of the island adjacent the touch data values adjacent the edge location (shown as Peak−1 in FIG. 5). These phantom touch data values are labeled as Mirrored in FIG. 5.

A first sharpness is then calculated using a first normalization (strength normalization) and not a second normalization (peak normalization). If the ratio was below the threshold ratio in Block 216, the edge correction as described above is applied, and the phantom touch data values are included with the touch data values of the island when calculating the first sharpness (Block 218a). If the ratio was not below the threshold ratio in Block 216, the edge correction is not applied, and the touch data values for the island as originally taken are used for this sharpness calculation (Block 218b).

Figure 3:
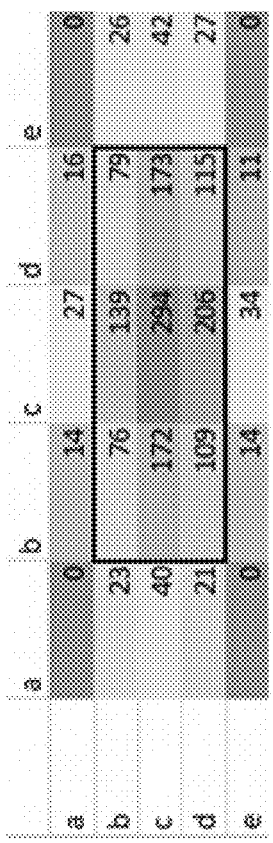
FIG. 3 is a chart showing an island of touch data values.

The sharpness calculation of Block 218b is now described with reference to FIG. 3, which shows the data values for a sample island. The row and column labeled "c" represent the peak value, the rows and columns labeled "a" and "e" represent values two away from the peak (thus, peak−2 and peak+2), the rows and columns labeled "b" and "d" represent values adjacent the peak (thus, peak−1 and peak+1).

Then, sharpness along the rows is calculated as:

$$RxSharpness = (1.5c - 0.5(b+d) - 1.25(a+e))*500,$$

where the letters a, b, c, d, and e each represent node strengths.

Thereafter, the sharpness along the columns is calculated as:

$$TxSharpness = (1.5c - 0.5(b+d) - 1.25(a+e))*500,$$

where the letters a, b, c, d, and e each represent node strengths.

The first sharpness is then calculated as:

$$1^{st}\ Sharpness = (TxSharpness + RxSharpness)*250/SumStrength,$$

where SumStrength is the sum of the values of a 3×3 island around the peak.

The sharpness calculation of Block 218a proceeds the same as the sharpness calculation of Block 218b, but with the phantom touch data values from the edge correction added to the island.

If the first sharpness is not above the minimum sharpness threshold (for the small or large stylus settings, depending on which were loaded), the island is rejected (performed at both Blocks 220a and 220b).

If the first sharpness is above the minimum sharpness threshold, then a second sharpness is calculated using both the first normalization (strength normalization) and second normalization (peak normalization).

For the case where edge correction was not applied (Block 222b), sharpness along the rows here is calculated as:

$$RxSharpness = (1.5c - 0.5(b+d) - 1.25(a+e))*500/c,$$

where the letters a, b, c, d, and e each represent a sum of the corresponding row.

Thereafter, the sharpness along the columns is calculated as:

$$TxSharpness = (1.5c - 0.5(b+d) - 1.25(a+e))*500/c,$$

where the letters a, b, c, d, and e each represent a sum of the corresponding column.

The second sharpness is then calculated as:

$$1^{st}\ Sharpness = (TxSharpness + RxSharpness)*250/SumStrength,$$

where SumStrength is the sum of the values of a 3×3 island around the peak.

For the case where edge correction was applied (Block 222a), the second sharpness calculation begins with calculation of a sharpness as it is for Block 222b (referred to here as sharpness') but with the phantom touch data values from the edge correction added to the island. Then the second sharpness for Block 222a is calculated as:

$$2^{nd}\ Sharpness = Sharpness'/(2-R),$$

where R is the ratio of the average to the peak of a 2×2 island about the peak value.

Figure 6:
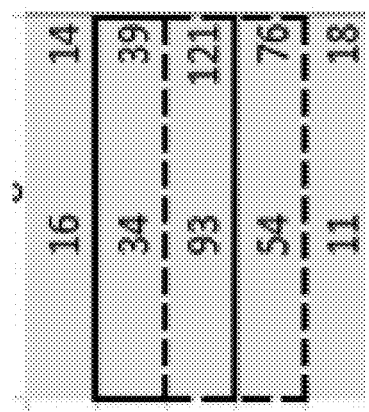
FIG. 6 is a chart showing a 2×2 island of touch data values where the peak value is at the edge of the touch screen.

As will be appreciated, two 2×2 islands are possible as shown in FIG. 6, and the island with the maximum total strength is used to get the average used for the calculation of R. In the case where the peak value of the island is in the corner, the second sharpness is calculated as:

$$2^{nd}\ Sharpness = Sharpness'/(3-(R1+R2)),$$

where R1 is the ratio of the average to the peak of the 2×2 island about the peak value using the values from the first possible 2×2 window to get the average, and where R2 is the ratio for the average to the peak of the 2×2 island about the peak values using the values from the second possible 2×2 window to get the average.

Figure 7:
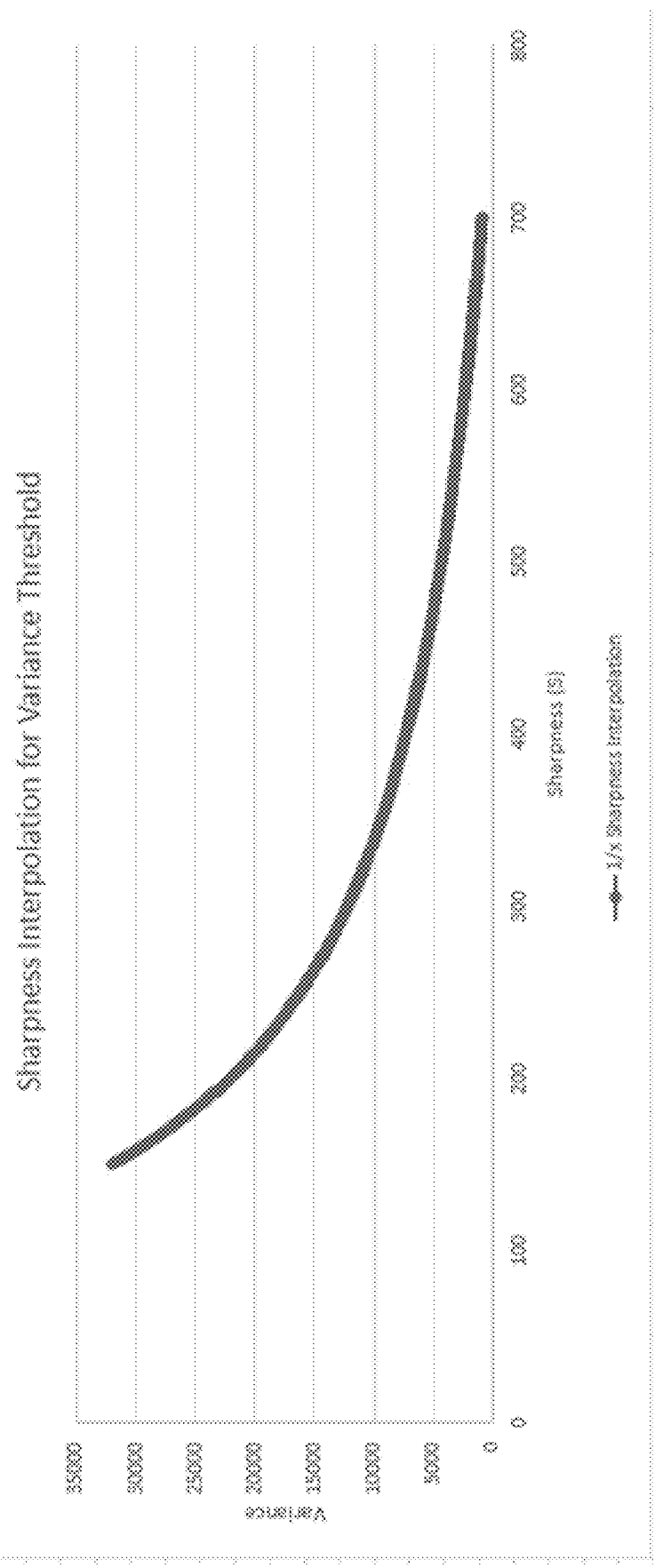
FIG. 7 is a graph showing interpolation of the dynamic variance threshold calculated in FIG. 2.

Then, a dynamic variance threshold is determined (Blocks 224a, 224b) based on a 1/x interpolation of sharpness, as shown in FIG. 7. The calculation is performed as follows:

$$DynVarThresh = 1st\ Threshold + (2nd\ Threshold - 1st\ Threshold) * \left( \frac{2nd\ Sharpness' - UpperSharpThresh'}{LowerSharpThresh' - UpperSharpThresh'} \right)$$

where $2^{nd}\ Sharpness' = \frac{1}{2}^{nd}\ Sharpness$,
where $UpperSharpThresh' = 1/UpperSharpThresh$, and
where $LowerSharpThresh' = 1/LowerSharpThresh$.

The variance of the island is then compared to the dynamic variance threshold (Blocks 226a, 226b), and if the variance is not greater than the dynamic variance threshold, the island is rejected.

Figure 4:
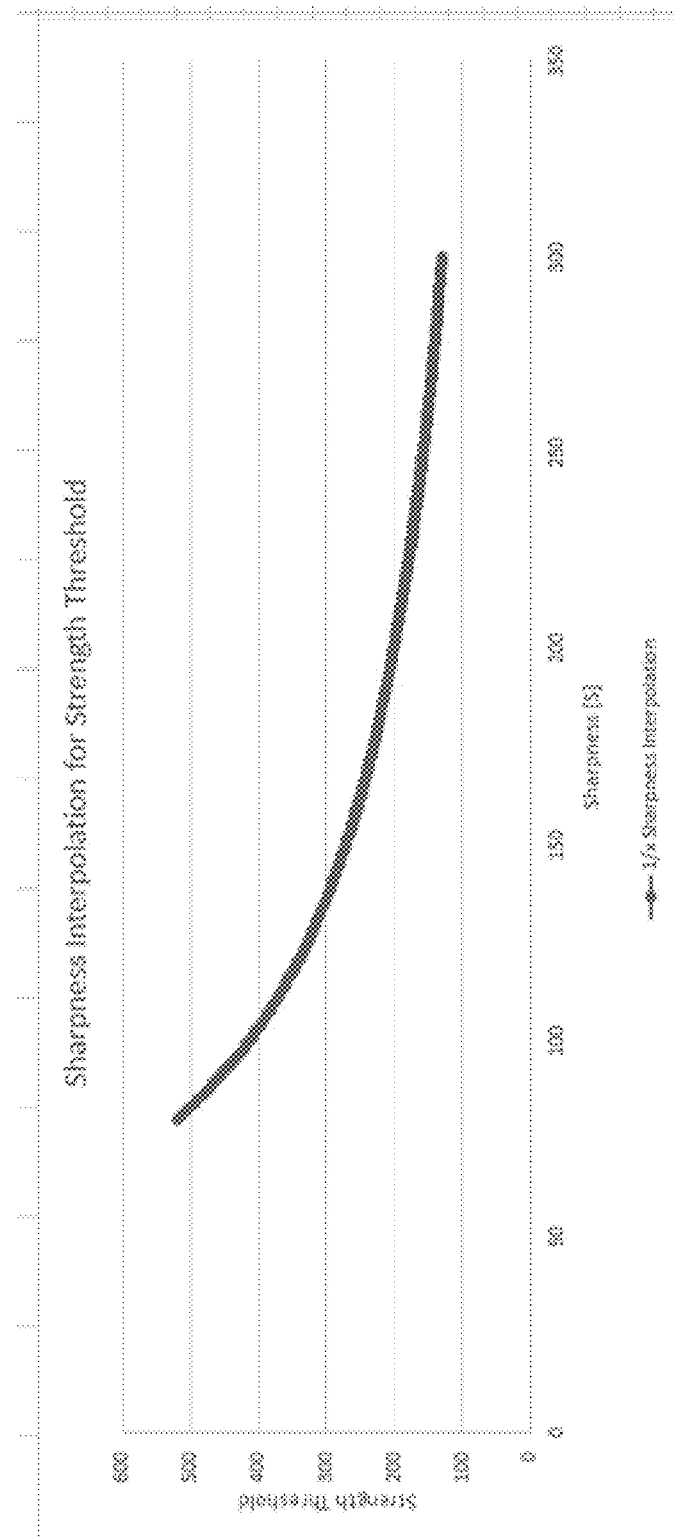
FIG. 4 is a graph showing interpolation of the dynamic strength threshold calculated in FIG. 2.

If the variance is greater than the dynamic variance threshold, then a dynamic strength threshold is determined (Blocks 228a, 228b). Determination of the dynamic strength threshold proceeds as follows. If the second sharpness is greater than an upper sharpness threshold (set as per either the small or large stylus settings), then the dynamic strength threshold is set to a first threshold. If the second sharpness is less than a lower sharpness threshold (set as per either the small or large stylus settings), then the dynamic strength threshold is set to a second threshold different than the first threshold. If the second sharpness is between the lower and upper sharpness thresholds, then the dynamic strength threshold is set via a 1/x interpolation, as shown in FIG. 4.

The peak strength of the island is then compared to the dynamic strength threshold (Blocks 230a, 230b). If the peak strength of the island is less than the dynamic strength threshold, then the island is rejected. If the peak strength of the island is greater than the dynamic strength threshold, then the stylus island is valid.

Coordinates of a touch location on the touch screen may then be determined by the touch screen controller 106 based on the island being a valid stylus island, and passed to the system on a chip 102 for use in application or operating system execution.

Although the above has been described with reference to the touch screen controller 106 performing the described steps and techniques, it should be appreciated that in some applications, the SoC 102 may instead perform the above described steps and techniques.

Each of the steps performed above may be performed in a period of time quicker than a human is capable of, such as in under 1 second, or even under 0.5 second, or even under 0.1 second, usually on the order of 10 s of milliseconds. It should be appreciated that the touch screen controller 106 is a specific purpose computing device, with transistors and/or logic gates specifically programmed so as to carry out the techniques described herein. Thus, the touch screen controller 106 contains measurable and observable physical differences over an unprogrammed generic purpose computer or processor. It should also be understood that the techniques described herein necessarily arise out of touch screen technology—that is, in the absence of capacitive touch screens, the techniques herein would not exist. Thus, these techniques are not directed to disembodied information processing, but are instead directed to the determination of the spatial relationship between two physical objects, the stylus and the touch screen. Moreover, these techniques improve the performance of the touch screen technology to which they are applied, increasing the precision and accuracy of the touch detection performed by the touch screen.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. An electronic device, comprising:
a touch screen controller configured to:
  identify an island in a matrix of acquired touch data values, the island comprising adjacent touch data values indicating a potential touch of a touch screen;
  calculate a first sharpness of the island using a first normalization type and not a second normalization type;
  calculate a second sharpness of the island using the first and second normalization types when the first sharpness is greater than a sharpness threshold;
  determine a dynamic variance threshold as a function of the second sharpness when the first sharpness is greater than the sharpness threshold; and
  when the first sharpness is greater than the sharpness threshold, determine a dynamic strength threshold as a function of the second sharpness if a variance of the island is greater than the dynamic variance threshold and determine the island to be a valid stylus island if a peak strength of the island is greater than the dynamic strength threshold.

2. The electronic device of claim 1, wherein the first normalization type is a strength normalization.

3. The electronic device of claim 1, wherein the second normalization type is a peak normalization.

4. The electronic device of claim 1, wherein the touch screen controller is configured to determine the dynamic strength threshold by:
  determining the dynamic strength threshold as a set stylus threshold if the second sharpness is greater than an upper sharpness threshold;
  determining the dynamic strength threshold as a set finger threshold if the second sharpness is less than a lower sharpness threshold; and
  determining the dynamic strength threshold as a sum of the set stylus threshold and an interpolated stylus threshold if the second sharpness is greater than the lower sharpness threshold and less than the upper sharpness threshold.

5. The electronic device of claim 1, wherein the touch screen controller is configured to determine coordinates of a touch location on the touch screen based on the island being a valid stylus island.

6. An electronic device, comprising:
a touch sensitive display;
a processor coupled to the touch sensitive display and configured to:
  acquire touch data values from the touch sensitive display;
  identify an island in the touch data values, the island comprising touch data values acquired from adjacent locations of the touch sensitive display indicating a potential touch;
  compare a sum of the touch data values of the island to small and large stylus thresholds, and generate stylus settings based thereupon;
  calculate a first sharpness of the island using a first normalization type and not a second normalization type, and reject the island if the first sharpness is not greater than a sharpness threshold, the sharpness threshold being a function of the stylus settings;
  calculate a second sharpness of the island using the first and second normalization types when the first sharpness is greater than the sharpness threshold;
  determine a dynamic variance threshold as a function of the second sharpness when the first sharpness is greater than the sharpness threshold, and reject the island if a variance of the island is lower than the dynamic variance threshold;
  when the first sharpness is greater than the sharpness threshold, determine a dynamic strength threshold as a function of the second sharpness, and reject the island if a peak strength of the island is less than the dynamic strength threshold; and
  determine the island to be a valid stylus island if the peak strength is greater than the dynamic strength threshold.

7. The electronic device of claim 6,
wherein the processor is configured, if a peak touch data value of the island is adjacent an edge location of the touch sensitive display and if a ratio between touch data values of the island adjacent touch data values adjacent an edge location of the touch sensitive display and the touch data values adjacent the edge location is less than a threshold ratio, to generate phantom touch data values for the island as a function of a difference between touch data values of the island adjacent the edge location and touch data values of the island adjacent the touch data values adjacent the edge location;
wherein the first sharpness is calculated using the touch data values for the island and the phantom touch data values for the island; and
wherein the second sharpness is calculated as a ratio of a third sharpness calculated using the touch data values for the island and the phantom touch data values for the island, and a difference between a defined constant and a ratio of an average value to a peak value of the island.

8. The electronic device of claim 6, wherein the first normalization type is a strength normalization.

9. The electronic device of claim 6, wherein the second normalization type is a peak normalization.

10. The electronic device of claim 6, wherein the processor is configured to determine the dynamic strength threshold by:

determining the dynamic strength threshold as a set stylus threshold if the second sharpness is greater than an upper sharpness threshold;

determining the dynamic strength threshold as a set finger threshold is the second sharpness is less than a lower sharpness threshold; and determining the dynamic strength threshold as a sum of the set stylus threshold and an interpolated stylus threshold if the second sharpness is greater than the lower sharpness threshold and less than the upper sharpness threshold;

wherein the upper and lower sharpness thresholds are a function of the stylus settings.

11. The electronic device of claim 6, where the processor is configured to generate the stylus settings as small stylus settings where the sum is less than the lower stylus size threshold, and as large stylus settings where the sum is larger than the lower stylus size threshold and smaller than the upper stylus size threshold.

12. The electronic device of claim 6, wherein the processor is configured to determine coordinates of a touch location on the touch screen based on the island being a valid stylus island.

13. The electronic device of claim 6, wherein the processor is part of a touch screen controller.

14. The electronic device of claim 6, wherein the processor is part of a system on a chip.

15. A method, comprising:
acquiring touch data values from a touch sensitive display;

identifying an island in the touch data values, the island comprising touch data values acquired from adjacent locations of the touch sensitive display indicating a potential touch;

determining whether the touch data values indicate a large stylus or small stylus, and generating stylus settings based thereupon;

calculating a first sharpness of the island using a first normalization type and not a second normalization type;

calculating a second sharpness of the island using the first and second normalization types when the first sharpness is greater than a sharpness threshold, the sharpness threshold being a function of the stylus settings;

determining a dynamic variance threshold as a function of the second sharpness when the first sharpness is greater than the sharpness threshold;

when the first sharpness is greater than the sharpness threshold, determining a dynamic strength threshold as a function of the second sharpness if a variance of the island is greater than the dynamic variance threshold; and determining the sand to be a valid stylus sand if the peak strength is greater than the dynamic strength threshold.

16. The method of claim 15, wherein the first normalization type is a strength normalization.

17. The method of claim 15, wherein the second normalization type is a peak normalization.

18. The method of claim 15, wherein determining the dynamic strength threshold comprises:
determining the dynamic strength threshold as a set stylus threshold if the second sharpness is greater than an upper sharpness threshold;

determining the dynamic strength threshold as a set finger threshold is the second sharpness is less than a lower sharpness threshold; and determining the dynamic strength threshold as a sum of the set stylus threshold and an interpolated stylus threshold if the second sharpness is greater than the lower sharpness threshold and less than the upper sharpness threshold;

wherein the upper and lower sharpness thresholds are a function of the stylus settings.

19. The method of claim 15, where the stylus settings are generated as small stylus settings where the sum is less than the lower stylus size threshold, and as large stylus settings where the sum is larger than the lower stylus size threshold and smaller than the upper stylus size threshold.

20. The method of claim 15, further comprising:
generating, if a peak touch data value of the island is adjacent an edge location of the touch sensitive display and if a ratio between a sum of touch data values of the island adjacent touch data values adjacent an edge location of the touch sensitive display and a sum of the touch data values adjacent the edge location is less than a threshold ratio, phantom touch data values for the island as a function of a difference between touch data values of the island adjacent the edge location and touch data values of the island adjacent the touch data values adjacent the edge location;

wherein the first sharpness is calculated using the touch data values for the island and the phantom touch data values for the island; and wherein the second sharpness is calculated as a ratio of a third sharpness calculated using the touch data values for the island and the phantom touch data values for the island, and a difference between a defined constant and a ratio of an average value to a peak value of the island.

21. A method, comprising:
identifying an island in a matrix of acquired touch data values, the island comprising adjacent touch data values indicating a potential touch of a touch sensitive screen;

calculating a first sharpness of the island using a first normalization type and not a second normalization type;

calculating a second sharpness of the island using the first and second normalization types when the first sharpness is greater than a sharpness threshold;

determining a dynamic variance threshold as a function of the second sharpness when the first sharpness is greater than the sharpness threshold; and when the first sharpness is greater than the sharpness threshold, determining a dynamic strength threshold as a function of the second sharpness if a variance of the island is greater than the dynamic variance threshold, and determining the island to be a valid stylus island if a peak strength of the island is greater than the dynamic strength threshold.

22. The method of claim 21, wherein the first normalization type is a strength normalization.

23. The method of claim 21, wherein the second normalization type is a peak normalization.

24. The method of claim 21, wherein determining the dynamic strength threshold comprises:
determining the dynamic strength threshold as a set stylus threshold if the second sharpness is greater than an upper sharpness threshold;

determining the dynamic strength threshold as a set finger threshold is the second sharpness is less than a lower sharpness threshold; and determining the dynamic strength threshold as a sum of the set stylus threshold and an interpolated stylus threshold if the second sharpness is greater than the lower sharpness threshold and less than the upper sharpness threshold.

25. The method of claim 21, further comprising determining coordinates of a touch location on the touch screen based on the island being a valid stylus island.

* * * * *

UNITED STATES PATENT AND TRADEMARK OFFICE
CERTIFICATE OF CORRECTION

PATENT NO.        : 10,175,807 B2
APPLICATION NO.   : 14/974299
DATED             : January 8, 2019
INVENTOR(S)       : Praveesh Chandran et al.

Page 1 of 1

It is certified that error appears in the above-identified patent and that said Letters Patent is hereby corrected as shown below:

In the Claims

At Column 9, Claim number 15, Line 54, please replace the phrase [[ determining the sand to be a valid stylus sand ]] with the phrase -- determining the island to be a valid stylus island --.

Signed and Sealed this
Fourth Day of June, 2019

Andrei Iancu
*Director of the United States Patent and Trademark Office*